United States Patent
Steel, Jr.

(10) Patent No.: US 7,430,283 B2
(45) Date of Patent: Sep. 30, 2008

(54) INTERNET ACCESS TO TELECOMMUNICATIONS RELAY SERVICE

(75) Inventor: James A. Steel, Jr., West Berlin, NJ (US)

(73) Assignee: Omega Products Corporation, West Berlin, NJ (US)

( * ) Notice: Subject to any disclaimer, the term of this patent is extended or adjusted under 35 U.S.C. 154(b) by 813 days.

(21) Appl. No.: 10/605,896

(22) Filed: Nov. 4, 2003

(65) Prior Publication Data

US 2004/0111268 A1 Jun. 10, 2004

Related U.S. Application Data

(60) Provisional application No. 60/424,164, filed on Nov. 6, 2002.

(51) Int. Cl.
*H04M 11/00* (2006.01)

(52) U.S. Cl. ..................... 379/52; 379/90.01

(58) Field of Classification Search ............. 379/52, 379/90.01, 93.15, 265.09, 265.13, 266.02; 370/352
See application file for complete search history.

(56) References Cited

U.S. PATENT DOCUMENTS

| | | | |
|---|---|---|---|
| 4,012,599 A | 3/1977 | Meyer | |
| 4,546,383 A | 10/1985 | Abramatic et al. | |
| 4,754,474 A | 6/1988 | Feinson | |
| 4,777,469 A | 10/1988 | Engelke et al. | |
| 4,897,868 A | 1/1990 | Engelke et al. | |
| 4,903,290 A | 2/1990 | King | |
| 5,253,285 A | 10/1993 | Alheim | |
| 5,327,493 A | 7/1994 | Richmond et al. | |
| 5,388,146 A | 2/1995 | Morduch et al. | |
| 5,463,665 A | 10/1995 | Millios et al. | |
| 5,475,733 A | 12/1995 | Eisdorfer et al. | |
| 5,481,589 A | 1/1996 | Morduch | |
| 5,499,285 A | 3/1996 | Morduch | |
| 5,521,960 A | 5/1996 | Aronow | |
| 5,559,855 A | 9/1996 | Dowens et al. | |
| 5,559,856 A | 9/1996 | Dowens et al. | |

(Continued)

*Primary Examiner*—Stella Woo
(74) *Attorney, Agent, or Firm*—Stanley H. Kremen

(57) ABSTRACT

A method and a system that will allow a hearing impaired person to access a TRS (Telecommunications Relay Service) center via an Internet terminal on the World Wide Web instead of using a TTY device on the telephone network. The present invention represents a modification or add-on to the methodology and systems currently employed by TRS centers throughout the country. Therefore, a TRS center will be able to handle operator assisted relayed telephone calls both using the present POTS (Plain Old Telephone Service) and the World Wide Web. Additional equipment will be required for a center to implement the present invention, said equipment comprising a TRS Packet Server and a router connected to the internet. When a hearing impaired customer wishes to place a call, secured communication is first established over the internet with a Nationwide TRS Routing Server. The Nationwide Routing server then finds a TRS center to handle the call. Once the center has been selected and an operator from that center has been assigned to the customer, further communications from the customer is directly with the TRS Center. A relayed telephone call is handled by the hearing impaired customer using received and transmitted text in an internet chat window where the customer and the operator type their respective conversation. The same relayed telephone call with the hearing party is handled by voice conversation with the operator.

6 Claims, 9 Drawing Sheets

U.S. PATENT DOCUMENTS

| | | |
|---|---|---|
| 5,559,857 A | 9/1996 | Dowens et al. |
| 5,627,530 A | 5/1997 | Israel et al. |
| 5,670,957 A | 9/1997 | Morduch et al. |
| 5,724,405 A | 3/1998 | Engelke et al. |
| 5,745,550 A | 4/1998 | Eisdorfer et al. |
| 5,809,112 A | 9/1998 | Ryan |
| 5,909,482 A | 6/1999 | Engelke |
| 5,917,888 A | 6/1999 | Giuntoli |
| 5,974,116 A | 10/1999 | Engelke |
| 6,075,842 A | 6/2000 | Engelke |
| 6,233,314 B1 | 5/2001 | Engelke |
| 6,252,869 B1 * | 6/2001 | Silverman .................. 370/352 |
| 6,307,921 B1 | 10/2001 | Engelke |
| 6,381,309 B1 | 4/2002 | Tremblay |
| 6,421,425 B1 * | 7/2002 | Bossi et al. ................... 379/52 |
| 6,493,695 B1 * | 12/2002 | Pickering et al. .............. 706/47 |
| 6,950,500 B1 * | 9/2005 | Chaturvedi et al. ........... 379/52 |
| 2002/0064256 A1 | 5/2002 | Engelke |
| 2002/0080926 A1 | 6/2002 | Engelke |
| 2002/0094844 A1 | 7/2002 | Lai et al. |
| 2003/0069997 A1 * | 4/2003 | Bravin et al. ................ 709/250 |
| 2003/0185359 A1 * | 10/2003 | Moore et al. ........... 379/114.01 |

* cited by examiner

INTERNET ACCESS TO TELECOMMUNICATIONS RELAY SERVICE

CROSS REFERENCE TO RELATED APPLICATIONS

This is a non-provisional counterpart and claiming benefit of U.S. Provisional Application Ser. No. 60/424,164, filed Nov. 6, 2002, said provisional application being incorporated in its entirety herein by reference.

BACKGROUND OF INVENTION

The Americans for Disabilities Act of 1990 requires that any company providing inter-exchange telecommunications services must provide access to people with disabilities. This law requires that all telephone companies in the United States and its possessions must provide access to people with disabilities including those that are deaf, hard of hearing and speech impaired. All states are required to establish TRS (Telecommunications Relay Service) for these individuals. Essentially, TRS connects those who can hear and speak with those who can't via the telephone network.

Typically, a person who is deaf, hard of hearing or speech impaired accesses TRS with a device known as a TTY (Teletype Device) or TDD (Telecommunications Device for the Deaf). TTYs have a single or multiple line display with a keyboard and a modem to connect to a telephone line. Deaf individuals have communicated with each other over the telephone network since the late 1960s with these devices. Communications with these devices are accomplished by typing on a keyboard and have the words appear on the TTY displays of both parties. Some TTYs have a printer attached to allow printing of the conversation.

TRS centers bridge the gap between people with TTYs and those who use telephone sets (POTS) to communicate over the telephone network. A TRS center is a call center that has from ten to hundreds of relay operators, know as Communications Assistants (CA). These CAs each work at a terminal and receive calls from TTY users requesting to call a person with normal speech and hearing (voice person). The CA will place calls for these individuals and relay the exact conversation. In other words, the CA will read the text received from the TTY user to the voice person and type the response from the voice person back to the TTY user. A CA can also receive a call from a voice person who desires to call a person with a TTY.

TRS users access the TRS by dialing a toll free number or by dialing 711. Each state either has its own TRS center or contracts with a center in another state to handle TRS traffic. The cost to operate these centers are normally paid for by the companies providing inter-exchange telephone services in that state.

The present invention is a method and a system that will allow a person to access a TRS center via an Internet terminal on the World Wide Web instead of using a TTY device on the telephone network.

DETAILED DESCRIPTION

Figure 1:
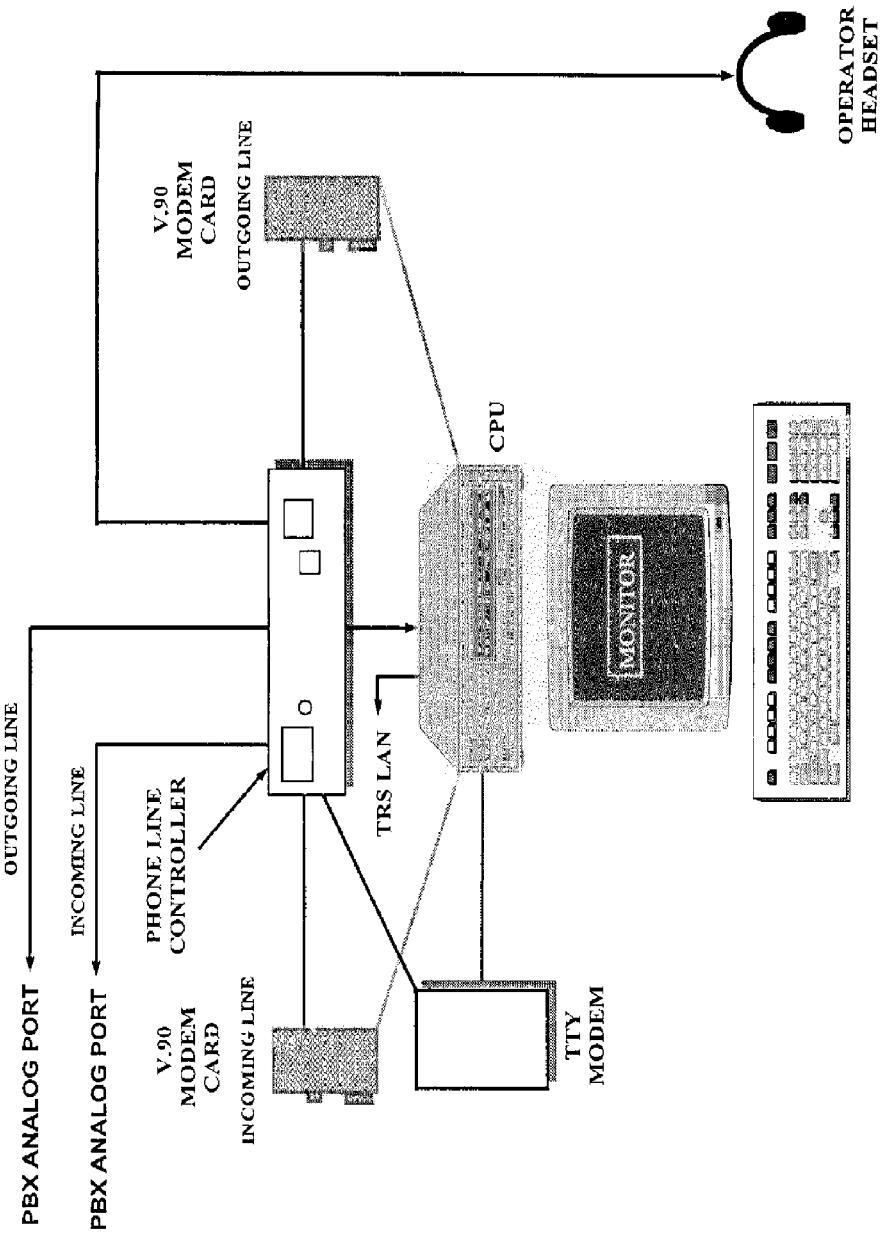
FIG. 1 is a schematic of a current typical TRS operator platform.
Figure 2:
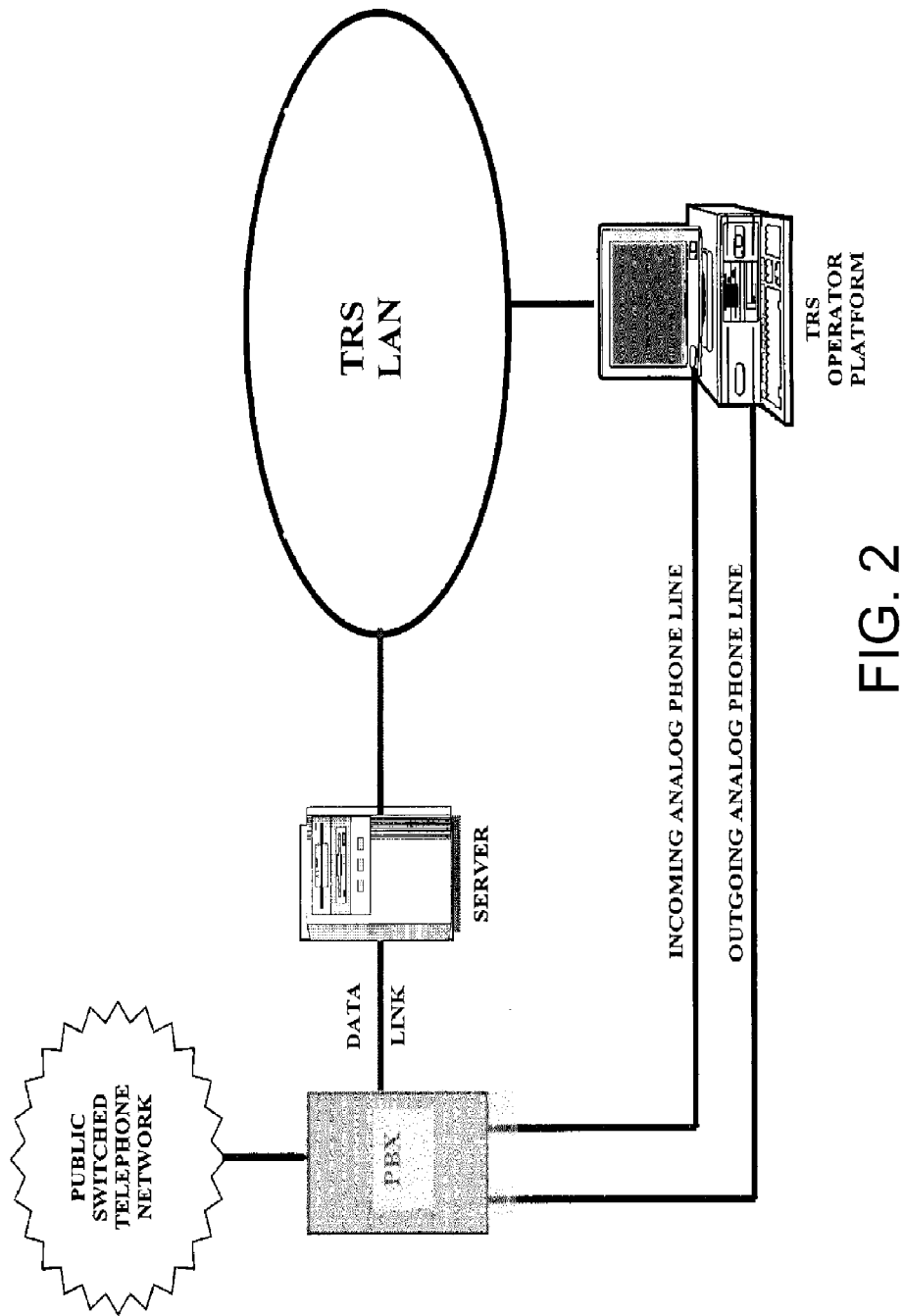
FIG. 2 is a schematic of a current typical TRS center.

The diagram of a conventional CA operator platform is shown in FIG. 1. Notice that there are two analog telephone line connections. One is used for the incoming caller and one is used for the outgoing caller. These connections need to be analog as opposed to digital because a modem connection to the telephone line will be required. A typical current TRS system diagram is shown in FIG. 2. This shows how the position is connected to a PBX. Typical call flow is as follows:

- The CA logs into the platform and sets status as available to take calls.
- The position is registered in the PBX as available and put in the queue to accept calls.
- Customer dials an 800 number for the PBX and arrives at the PBX via the PSTN.
- Call is routed to the next available CA in queue via an incoming analog telephone line to the CA's platform.
- The CA obtains the calling-to number from the customer.
- The CA dials the calling-to number and begins relaying the conversation.

Figure 3:
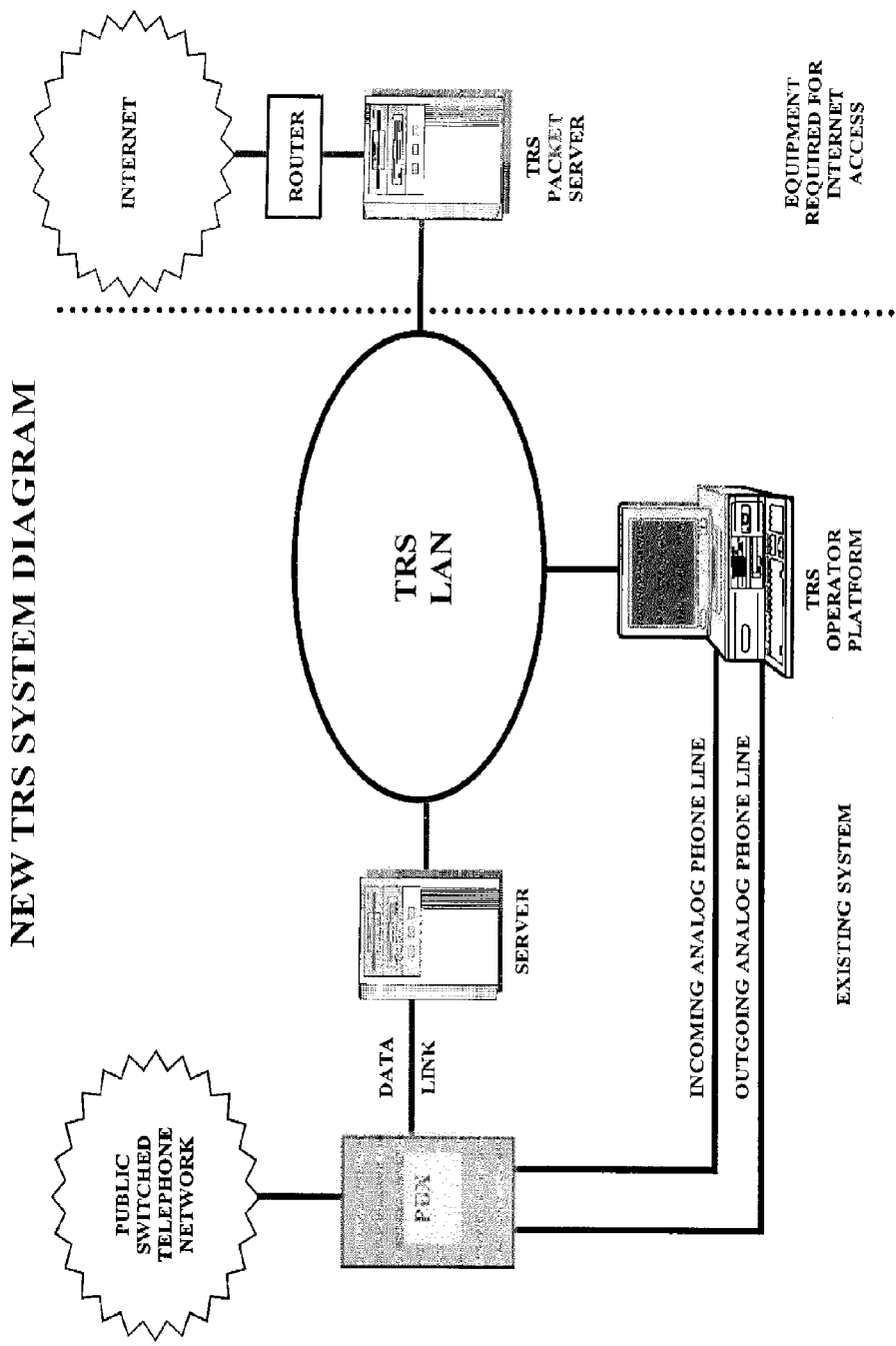
FIG. 3 is a schematic of a typical TRS center that would use the present invention.

Internet Access capability can be added to the TRS center by installing the additional equipment shown in FIG. 3, i.e., a TRS Packet Server and a router connected to the internet. In addition, modifications to the software on the TRS Operator Platform will be required to communicate with the new TRS Packet Server. Typical call flow for a TRS call arriving through Internet Access will be the same as discussed above but with the following additions:

- The CA position logs into the TRS Packet Server at the same time it logs into the PBX.
- The position will also be put in queue in the TRS Packet Server.
- When a call request arrives at the Packet Server, a call arrival message will be sent to the next available CA position via the LAN.
- If the position has not received a call via the PBX, a call accept message will be sent back to the Packet Server and at the same time the CA position will issue a make busy command to the PBX. The position will now process the TRS call for the internet customer.
- If the position has received a call while in queue at the PBX, a cancel call command will be sent to the Packet Server. The Packet Server will then select another CA position and send a new call arrival message to the position.

It is important to note that the criteria for selecting a position to receive a call in the Packet Server should be different then that in the PBX. Most PBXs use a selection process known as most idle selection. That is, position that is logged into the PBX queue for the longest amount of time without receiving a call receives the next call. The Packet Server will also maintain a queue of available positions. If a call arrives at the PBX via the PSTN and a call arrives via the Packet Server at the same time, it is possible for the same CA position to be selected by both the PBX and Packet Server to receive the calls. In order to minimize this possibility, the threshold in the Packet Server queue should be set to a higher level than the PBX queue.

Figure 4:
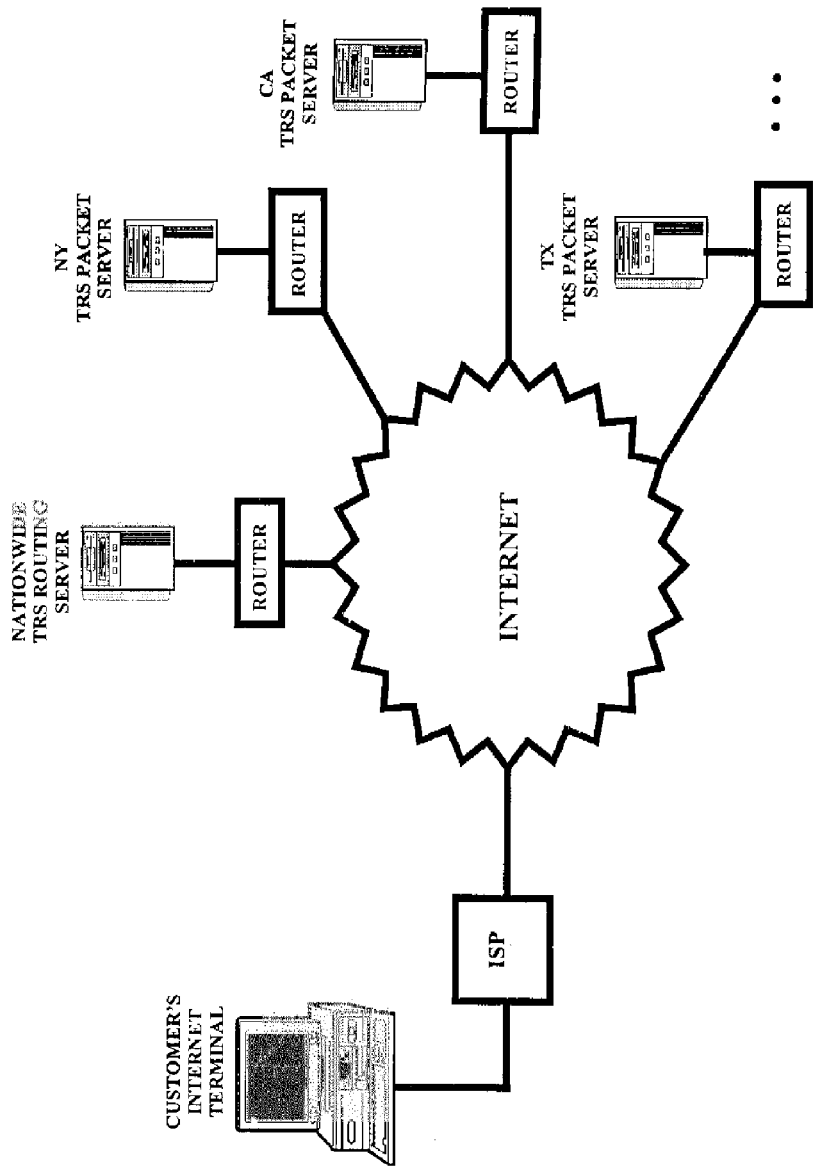
FIG. 4 is a schematic of the internet server.
Figure 5:
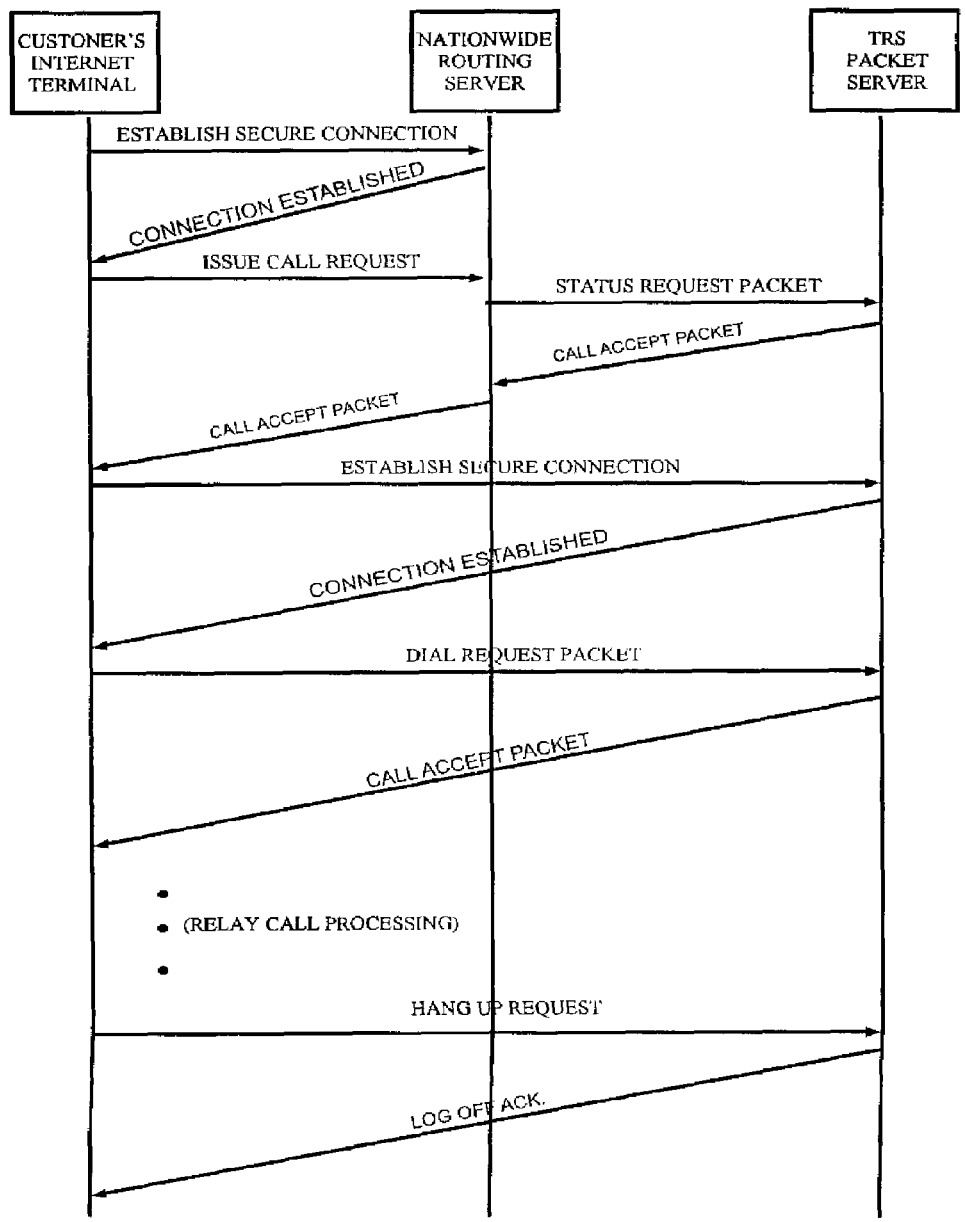
FIG. 5 is a message flow diagram showing the interaction between the customer's internet terminal, the nationwide routing server, and the TRS center packet server.

FIG. 4 shows a diagram on how multiple TRS centers can be connected to the Internet. One Nationwide TRS Routing Server will receive call requests from special software installed on customer's Internet terminals. This call request is a TCP packet that will contain as a minimum the following information: the customer's IP address, the number the customer wants to dial through TRS (calling-to number) and customers account number. The Routing Server will then assign this customer a serial number and the select a TRS center based on the calling to number and send a call request packet to the Packet Server at that center. This packet will contain the customer's serial number. If there are operators available to take calls at that center, a call-accept message will be sent back to the Routing Server with the customer's serial number, the IP address and TCP port of the routing server will be included for the customer to establish connection on. This information will then be forwarded back to the requesting customer. At this point the customer's software will send the call request packet directly to the TRS Packet Server using the IP address and TCP port information contained in the call accept packet. A secure connection will then be established using SSL or some other encryption method. A CA position will be selected and the TRS call can then proceed. A diagram of the message flow is shown in FIG. 5. The total from when the customer sends the call request packet to the Routing Server until a CA begins dialing the request should take less than three (3) seconds if there are CAs available in queue to take the call.

Figure 7:
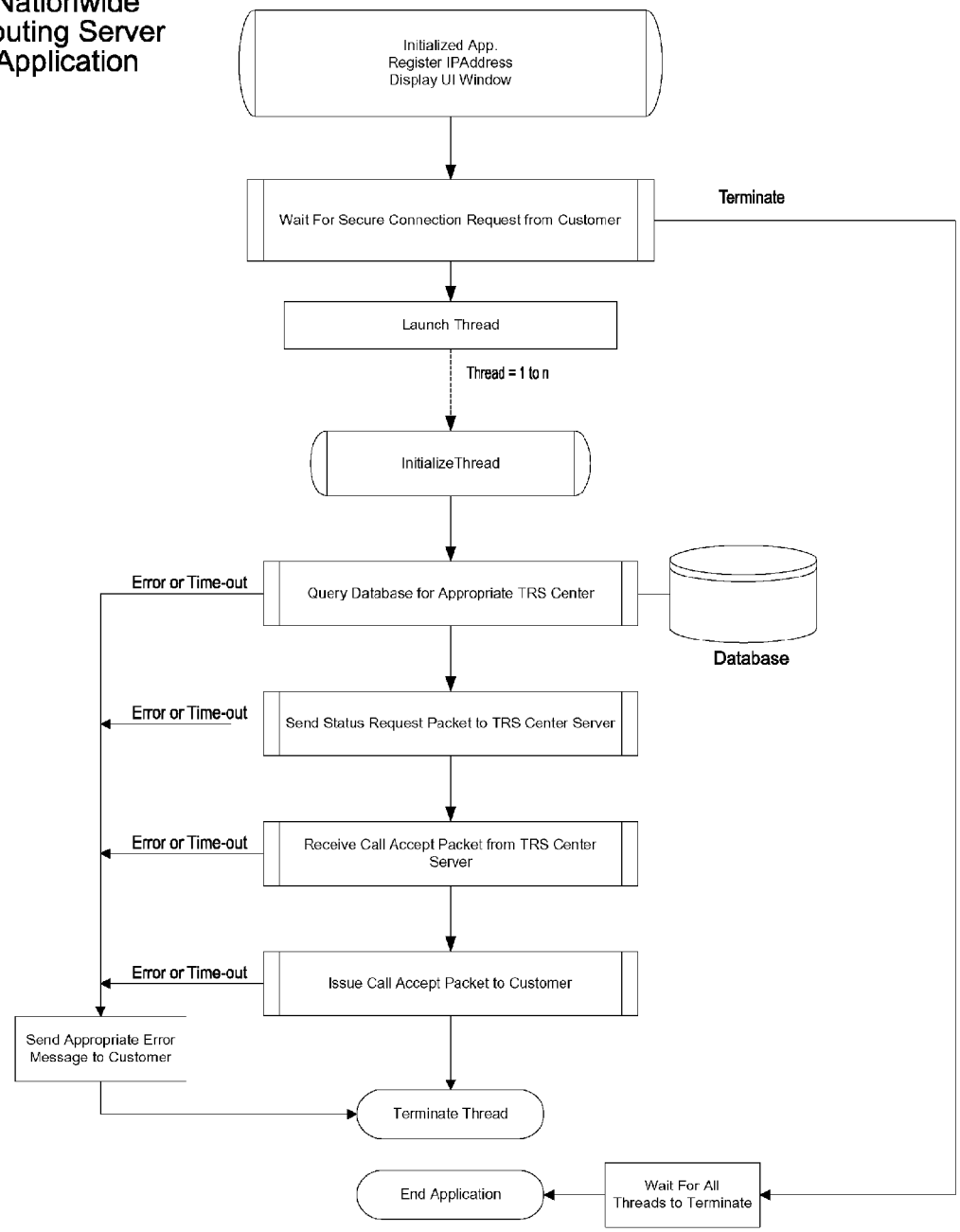
FIG. 7 is a flowchart for the nationwide routing server application.

Referring to FIG. 5, the flow is as follows:

1. The customer establishes a secure connection to the Nationwide Routing Server.
2. The Nationwide Routing Server responds with an acknowledgment that a secure connection has been established.
3. The customer issues a request for a TRS Operator to dial a number and initiate a telephone call.
4. The Nationwide Routing Server queries the data base for the appropriate TRS Center based upon where the call is to be placed. For example, if the customer wishes to dial a number in New York City, the Nationwide Routing Server designates the New York center. Typically, a single center handles several states. This step is shown in FIG. 7.
5. The Nationwide Routing Server queries the specific TRS Packet Server (e.g., New York) to determine whether an operator is available to place the call. If no operator is available, then optionally:
   a. Another center can be queried; or,
   b. An ALL OPERATORS BUSY message can be sent to the customer.
6. If an operator is available, the TRS Packet Server informs the Nationwide Routing Server that the TRS Center is prepared to accept the call, and an operator is assigned.
7. The Nationwide Routing Server informs the customer that the call is ready to proceed. The call-accept packet has the IP address of the chosen TRS Packet Server and the position number of the chosen operator.
8. A direct secure encrypted duplex connection is established between the customer and the chosen TRS Packet Server. At this time, the customer no longer communicates with the Nationwide Routing Server for this call.
9. The customer issues a formal request to dial a number.
10. The TRS Packet Server acknowledges that the call has been dialed. It reports back to the customer with a RINGING, BUSY, or INVALID (NOT IN SERVICE) message.
11. If the called party answers, the relay call is processed between the customer (who types his responses) and the hearing party (who speaks). The operator mediates between the two parties by speaking to the hearing party and typing responses to the customer.
12. When the call is complete, the customer issues a HANG-UP request.
13. The TRS Packet Server acknowledges HANG-UP to the customer.

In a typical application, the customer uses a conversation window not unlike that of a typical chat or instant messaging application. In fact, the software can be integrated with AOL Instant Messaging Software since the entry points and interface specifications are publicly known.

There are four software components to this system:
The Customer's Internet Terminal Application
The Nationwide Routing Server Software
The TRS Packet Server Software
The TRS Operator Platform Software Each of the components are linked together by an IP (Internet Protocol) connection. This section provides a functional specification for each software component.

Customer's Internet Terminal Software:

The Customer's Internet Terminal Software is a custom application that resides on the customer's Internet Personal Computer. This application is essentially a text box that allows the customer to communicate with a TRS Operator once the connection has been established to the TRS Packet Server. A summary of the TCP messages handled are shown in the tables below.

| Receive Packets | | |
| --- | --- | --- |
| Message Type | Received From | Description |
| Nationwide Secure Connection Established | Nationwide Routing Server | Confirmation of secure connection |
| TRS Server Secure Connection Established | TRS Packet Server | Confirmation of secure connection |
| Call Accept Packet | Nationwide Routing Server | Call has been placed to a TRS Operator and the TRS Operator has dialed the outbound party |
| TRS Operator Data | TRS Packet Server | Contains information text typed by the TRS Operator |
| Log Off Acknowledgement | TRS Packet Server | The outbound party has hung up. |
| Acknowledgement | TRS Packet Server | Acknowledgement packet |
| Error Packet | TRS Packet Server | Error condition |

| Transmit Packets | | |
| --- | --- | --- |
| Message Type | Sent To | Description |
| Establish Secure Connection to the Nationwide Routing Server | Nationwide Routing Server | Establish Secure Connection to Nationwide Routing Server |
| Call Request | Nationwide Routing Server | Originate a call |
| Establish Secure Connection to a TRS Packet Server | TRS Packet Server | Establish a secure connection to the TRS Packet Server |
| Dial Request | TRS Packet Server | Initiate a call to an outbound party |

-continued

Transmit Packets

| Message Type | Sent To | Description |
| --- | --- | --- |
| Customer Data Packet | TRS Packet Server | Customer-typed conversation text |
| Hang-up Request Packet | TRS Packet Server | Requests that operator disconnect the call |
| Acknowledgement | TRS Packet Server | Acknowledgement packet |
| Error Packet | TRS Packet Server | Error condition |

Figure 6:
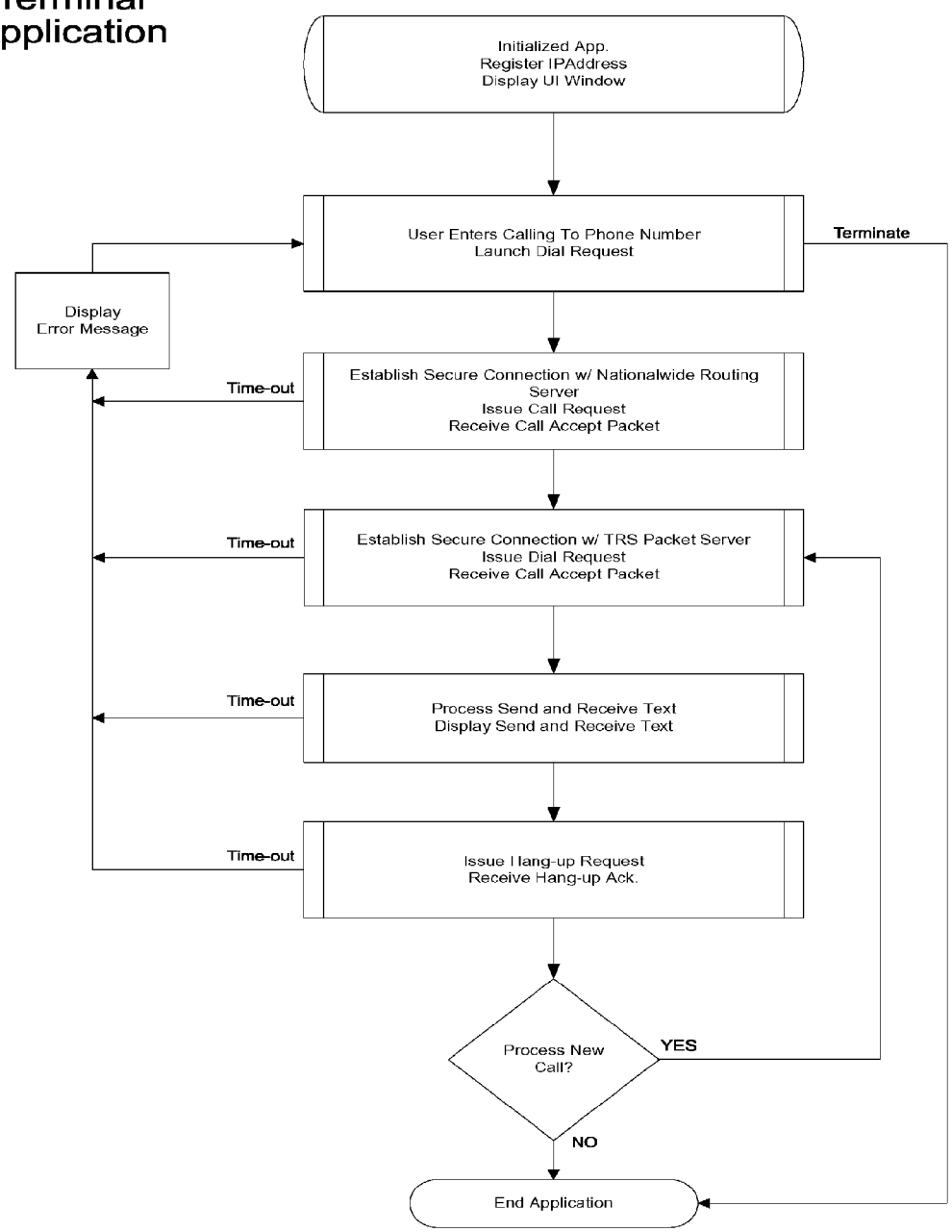
FIG. 6 is a flowchart for the customer's terminal application.

FIG. 6 is a flowchart for the customer's internet terminal software.

1. Upon initialization, the customer's IP address is noted, and the UI (User Interface) window is displayed.

2. The customer issues a dial request to the Nationwide Routing Server.

3. If an error occurs, the customer has the option to either hang-up or to try again. TERMINATE is when the customer aborts the operation or is otherwise disconnected.

4. TIME-OUTs occur when the customer takes too long to perform a certain task. These typically issue an error message, and requires the customer to reissue the dial request to the Nationwide Routing Server.

5. The customer establishes a secure connection with the Nationwide Routing Server, issues a call request, and receives a call accept packet.

6. The customer establishes a secure connection with the designated TRS Packet Server. The Nationwide Routing Server will no longer communicate with the customer unless there is a TIME-OUT. Once this connection is established, the dial request and call accept packet is transferred to the TRS Packet Server.

7. Once the call is in progress (i.e., the hearing party answers the phone), the customer's terminal is able to communicate with the operator by sending and receiving text.

8. When the call is complete, a HANG-UP request is issued, and a HANG-UP acknowledgment is received.

9. The customer now has the option of placing a new call without going back to the Nationwide Routing Server.

Nationwide Routing Server Software:

The Nationwide Routing Server Software simply provides a means to inform the Customer's Internet Terminal Application if there are any operators available to handle a call. It queries the various TRS Packet Servers at the TRS centers and finds the customer an available TRS Operator. If no operators are available an error message is sent to the customer to inform them that no operators are available and try back later.

Receive Packets

| Message Type | Received From | Description |
| --- | --- | --- |
| Establish Secure Connection | Customer's Internet Terminal | Request to establish a secure connection |
| Issue Call Request | Customer's Internet Terminal | Find an available TRS Operator |
| Call Accept Packet | TRS Packet Server | Agent Available |
| Error Packet | TRS Packet Server | Indicates Error Condition |
| Error Packet | Customer's Internet Terminal | Indicates Error Condition |

Transmit Packets

| Message Type | Sent To | Description |
| --- | --- | --- |
| Nationwide Secure Connection Established | Customer's Internet Terminal | Confirmation of secure connection |
| Status Request Packet | TRS Packet Server | Confirmation of secure connection |
| Call Accept Packet | Customer's Internet Terminal | Call has been placed to a TRS Operator and the TRS Operator has dialed the outbound party |
| Error Packet | TRS Packet Server | Indicates Error Condition |
| Error Packet | Customer's Internet Terminal | Indicates Error Condition |

FIG. 7 is a flowchart for the Nationwide Routing Server software.

1. Upon initialization, the Server's IP address is registered, and a UI window is displayed.

2. The software goes into a wait state until a secure connection request is received from the customer.

3. TERMINATE means that the server is shutting down. When it becomes necessary for the Nationwide Routing Server to shut down, the software waits for all threads to terminate, and then the application ends.

4. A thread is a specific task in a multi-tasking environment. The number of threads that may run simultaneously is hardware dependent. An individual call request represents a single thread. The lifetime of a typical thread is approximately 500 milli-seconds. However, this is dependent upon TIME-OUT parameters which represent a design choice.

5. Once a secure communication is established with the customer, the Nationwide Routing Server Software queries a database to locate the appropriate TRS Center.

6. Once the appropriate TRS Center is located, a Status Request is sent to the TRS Center Packet Server.

7. Once a call accept packet is received from the TRS Center Packet Server, the Nationwide Routing Server Software issues a call accept packet to the customer.

8. The Nationwide Routing Server's job with the particular customer is now complete, and the thread is terminated.

TRS Packet Server Software:

The TRS Packet Server Software essentially acts as a broker for messages sent between the Customer's Internet Terminal Application and the TRS Operator Platform Software. It also contains the queue of available TRS Operators and sets the queue threshold. A key feature of this system is the ability to keep several TRS Operators available to receive calls through the Public Switched Network (PBX). In order for calls placed through the Public Switched Network to receive priority, a higher queue threshold is set in the TRS Packet Server than the PBX. The following is the detail on how this system works.

1. A TRS Agent logs into the TRS Operator Terminal.

2. The TRS Operator Terminal sends a Make Available message to the PBX. This allows the TRS Operator to start receiving calls through the Public Switched Network. This step is only used for operators who are trained to handle TRS calls through the Public Switched Telephone Network.

3. The TRS Operator Terminal sends a Make Available message to the TRS Packet Server. This allows the TRS to start receiving calls from Internet Customers. This step is only used for operators who are trained to handle Internet TRS calls.

4. The TRS Packet Server will only send a new call to a TRS Operator if there are more than the threshold number of operators available in queue. Otherwise, the TRS Server will report No Operators Available back to the Nationwide Routing Server in response to a Status Request Packet.

5. If a PBX call is received at the position, a Position Busy message is sent to the TRS Packet Server to remove the position from the queue to receive new calls from Internet customers.

6. If an Internet Relay Call is received at a TRS Operator position, a Position Busy message is sent to the PBX to remove that operator position from the PBX queue.

7. When the TRS Agent logs out of the position, a Position Busy message is sent to both the PBX and to the TRS Packet Server to prevent the TRS Operator from receiving new calls.

The following tables lists the messages that the TRS Packet Server Software processes:

| Receive Packets | | |
|---|---|---|
| Message Type | Received From | Description |
| Status Request | Nationwide Routing Server | Requests if there are TRS Operators Available above the queue threshold |
| Position Available | TRS Operator Position | Place TRS Operator Position in queue |
| Position Busy | TRS Operator Position | Remove TRS Operator Position from queue |
| Establish Secure Connection | Customer's Internet Terminal Application | Request to establish secure connection |
| Dial Request Packet | Customer's Internet Terminal Application | Packet is forwarded to TRS Operator Position |
| Customer Data Packet | Customer's Internet Terminal Application | Packet is forwarded to TRS Operator Position |
| TRS Operator Data | TRS Operator Position | Packet is forwarded to Customer's Internet Terminal Application |
| Hang-up Acknowledgement | TRS Operator Position | Packet is forwarded to Customer's Internet Terminal Application |
| Acknowledgement | Customer's Internet Terminal Application or TRS Operator Position | Acknowledgement packet |
| Error Packet | Customer's Internet Terminal Application or TRS Operator Position | Error condition |

| Transmit Packets | | |
|---|---|---|
| Message Type | Sent To | Description |
| Status Reply | Nationwide Routing Server | Reports number of available operators above the queue threshold. |
| Call Accept Packet | Customer's Internet Terminal Application | Informs customer that call has been placed. |
| Secure Connection Established | Customer's Internet Terminal Application | Confirms that a secure connection has been established |
| Log-off Acknowledgement | Customer's Internet Terminal Application | Confirms that outbound party has hung-up |
| Customer Data Packet | TRS Operator Position | Packet is forwarded to TRS Operator Position |
| TRS Operator Data | TRS Operator Position | Packet is forwarded to TRS Operator Position |
| Acknowledgement | Customer's Internet Terminal Application or TRS Operator Position | Packet Acknowledgement |

Figure 8:
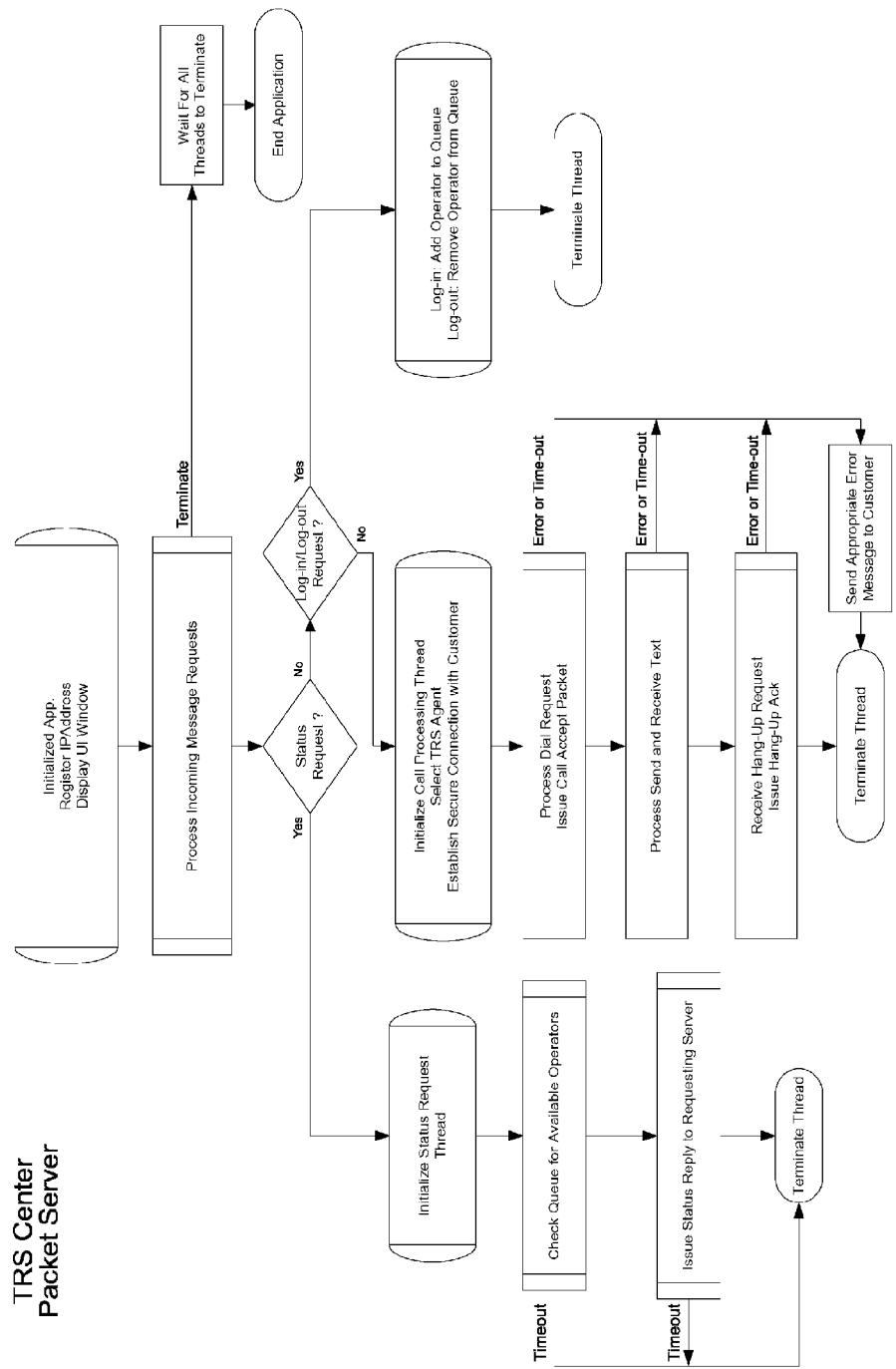
FIG. 8 is a flowchart for the TRS center packet server application.

FIG. 8 is a flowchart for the TRS Packet Server software.

1. Upon initialization, the IP address is registered and a UI window is displayed.

2. The software processes incoming message requests.

3. TERMINATE means that the server is shutting down. When it becomes necessary for the TRS Packet Server to shut down, the software waits for all threads to terminate, and then the application ends.

4. There are three types of message requests:
   a. status requests;
   b. requests to establish a secure connection with a customer; and,
   c. login requests from the Operator Stations.

TRS Operator Platform Software:

The TRS Operator Platform Software is pre-existing in the TRS Centers. In order to add Internet Access, a modification is required to process TCP packet messages between the TRS Packet Server and the TRS Operator Platform Software. The following tables lists the new messages that the TRS Operator Platform software needs to process:

| Receive Packets | | |
|---|---|---|
| Message Type | Received From | Description |
| Status Request | TRS Packet Server | Requests Operator Status |
| Establish Secure Connection | TRS Packet Server | Request to establish a secure connection |
| Dial Request Packet | TRS Packet Server | Contains the phone number that the customer is requesting the TRS Operator to dial |
| Customer Data Packet | TRS Packet Server | Contains information or conversation text typed by the customer |
| Hang-up Request Packet | TRS Packet Server | Customer Requests that Operator Disconnects the outbound party |
| Acknowledgement | TRS Packet Server | Packet Acknowledgement |
| Error Packet | TRS Packet Server | Checksum or other error information |

| Transmit Packets | | |
|---|---|---|
| Message Type | Sent To | Description |
| Status Reply | TRS Packet Server | Reports Operator Status |
| Position Available | TRS Packet Server | Places the TRS Operator Position in queue to receive calls |
| Position Busy | TRS Packet Server | Removes the TRS Operator Position from the queue to receive calls |
| Secure Connection Established | TRS Packet Server | Confirms that a secure connection is established |

-continued

Transmit Packets

| Message Type | Sent To | Description |
| --- | --- | --- |
| Call Accept Packet | TRS Packet Server | Confirms that the outbound party's number has been dialed by the TRS Operator |
| Outbound Customer Data Packet | TRS Packet Server | Contains the conversation text of the outbound (voice) customer typed by the TRS Operator |
| TRS Operator Data | TRS Packet Server | Contains information text typed by the TRS Operator |
| Log-off Acknowledgement | TRS Packet Server | The outbound party has been released by the TRS Operator |
| Acknowledgement | TRS Packet Server | Packet Acknowledgement |
| Error Packet | TRS Packet Server | Checksum or other error information |

The format of each packet is as follows: <Message Type><Checksum><Data Field Length><Data Field>

The Message Type is a two-byte field that defines a unique message type. The Checksum is a four-byte hex field representing the checksum of the Data Field. The Data Field Length is a two-byte hex field representing the length of the Data Field. The Data Field is a variable length (1–255 bytes) field containing the data.

The checksum of the Data Field of each packet and compared against the Checksum Field of the packet. Any errors are reported back to the sender by means of an Acknowledgment message. Also, Acknowledgment messages are used to acknowledge each Customer Data Packet received by the TRS Operator Platform Software. Acknowledgment messages are also sent from the Customer's Internet Terminal Application to the TRS Packet Server Software to acknowledge each TRS Operator Data packet.

Figure 9:
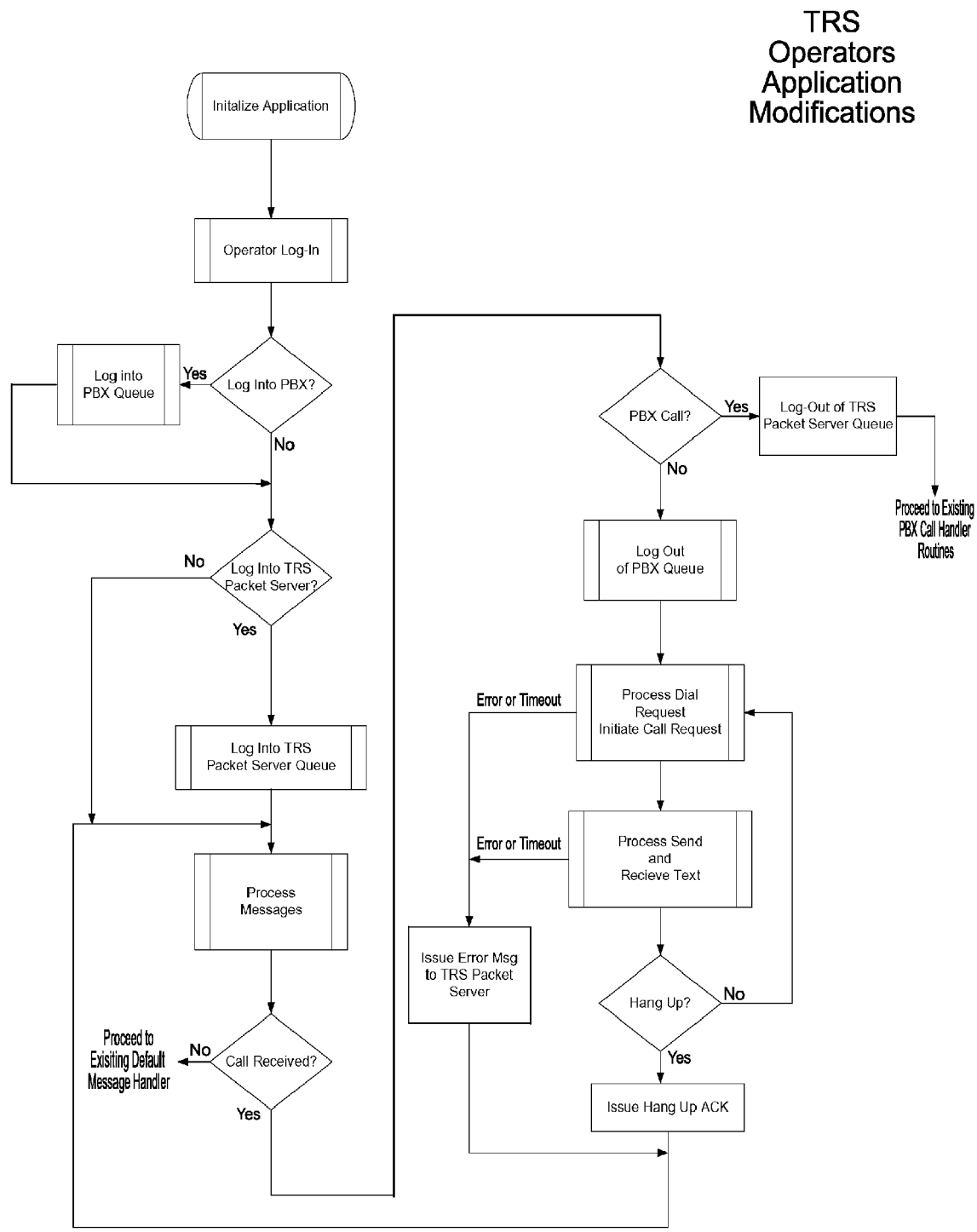
FIG. 9 is a flowchart for the TRS operator's application.

FIG. 9 is a flowchart for the modifications to the currently existing TRS Operator Platform software.

1. The operator logs onto the login screen at the terminal.
2. The application permits the operator to log onto the PBX at the TRS Center (the existing application) or onto TRS Packet Server (the present invention) or both (the present invention). These are two separate call queues.
3. If the operator logs onto both queues, he or she is able to handle calls from both. However, if a call comes in from either one of the queues, the application logs the operator off from the other queue.

The present invention has been successfully tested.

Key Advantages of the New System:

Public Switched Telephone Network calls to the TRS Center are given priority over Internet Relay calls by virtue of the queue threshold in the TRS Packet Server.

System can be added to existing TRS Relay Centers to add Internet Relay functionality. This provides a cost saving to the TRS provider Operators need only log into the PBX from the TRS Operator position to handle Public Switched Telephone Network calls if they have only been trained in handling traditional TRS calls.

Operators need only log into the TRS Packet Server from the TRS Operator position to handle Internet Relay TRS calls if they have only been trained in handling Internet Relay TRS calls.

The same TRS Operator positions and equipment can handle traditional TRS calls and Internet Relay calls.

I claim:

1. A method wherein a customer, who could be a hearing impaired person, may place an operator assisted relayed telephone call to a hearing person using the internet such that the hearing impaired person communicates with the operator by sending and receiving text messages in approximately real time, and such that the hearing person communicates with the operator using conventional voice telephony, whereby the hearing impaired person may communicate with the hearing person using the operator as an intermediary, comprising:
   a. the customer using his internet terminal to establish a secure connection to a Nationwide Routing Server;
   b. the Nationwide Routing Server establishing a secure connection to the customer's internet terminal;
   c. the customer issuing a call request via his internet terminal;
   d. the Nationwide Routing Server issuing a status request packet to a TRS Packet Server;
   e. the TRS Packet Server issuing a call accept packet to the Nationwide Routing Server;
   f. the Nationwide Routing Server issuing a call accept packet to the customer's internet terminal;
   g. the Nationwide Routing Server instructing the customer's internet terminal to direct all further communications to the TRS Packet Server;
   h. the Nationwide Routing Server terminating its connection with the customer's internet terminal;
   i. the customer's internet terminal establishing a secure connection to the TRS Packet Server;
   j. the TRS Packet Server establishing a secure connection to the customer's internet terminal;
   k. the customer issuing a dial request packet to the TRS Packet Server via his internet terminal;
   l. the TRS Packet Server issuing a call accept packet to the customer's internet terminal;
   m. processing the call once the hearing person answers his or her phone;
   n. the customer communicating with a TRS operator by sending and receiving text via his internet terminal;
   o. the hearing person communicating with the operator using standard voice communications; and,
   p. the operator relaying messages between the customer and the hearing person.

2. A system wherein a customer, who could be a hearing impaired person, may place a human operator assisted relayed telephone call to a hearing person using the internet such that the hearing impaired person communicates with the operator by sending and receiving text messages in approximately real time, and such that the hearing person communicates with the operator using conventional voice telephony, whereby the hearing impaired person may communicate with the hearing person using the operator as an intermediary, comprising a telecommunications relay service (TRS) operator station and terminal operatively connected to:
   a. a PBX unit that is operatively connected to a public switched telephone network using conventional telephone communications equipment; and,
   b. a local area network (TRS/LAN) that is operatively connected to:
      (1) a packet server that is operatively connected to the PBX unit using a data link; and,
      (2) a server that is operatively connected to the internet, such that the customer may communicate with the operator using either conventional telephone lines (POTS) or the internet and that said customer communication may be handled by an operator using the same TRS operator station and terminal regardless of whether the customer communicates with the operator using POTS or the internet.

3. The system of claim 2 wherein the internet connection further comprises:
   a. a connection to a nationwide TRS routing server; and,
   b. a plurality of local TRS routing servers;
   wherein the nationwide TRS routing server receives call requests from special software installed on the customer's internet terminal and directs further customer communications to one of the plurality of local TRS routing servers.

4. The system of claim 3 wherein a first queue is created wherein the TRS operator handles POTS relay telephone calls in a first sequence and a second queue is created wherein the TRS operator handles internet relay telephone calls in a second sequence, and wherein a queue priority is selectable.

5. The system of claim 4 wherein the first queue and the second queue are combined into a single queue thereby allowing the TRS operator to handle calls in a combined sequence comprising both POTS relay telephone calls and internet relay telephone calls.

6. The system of claim 4 wherein queue priority is given to the first queue.

* * * * *